United States Patent [19]
Meyer et al.

[11] Patent Number: 5,301,960
[45] Date of Patent: Apr. 12, 1994

[54] IMPROVED SPIRALLY-FORMED SEAL FOR SHAFTS AND VALVE STEMS

[75] Inventors: Reid M. Meyer, Atlanta; Jim B. Cohen, Lilburn; James W. Suggs, Jr.; Steven M. Suggs, both of Atlanta, all of Ga.

[73] Assignee: Suggs Group, Inc., Atlanta, Ga.

[21] Appl. No.: 879,144

[22] Filed: Apr. 30, 1992

Related U.S. Application Data

[63] Continuation of Ser. No. 782,897, Oct. 23, 1991, abandoned, which is a continuation of Ser. No. 331,406, Mar. 31, 1989, abandoned.

[51] Int. Cl.$^5$ .............................................. F16J 15/12
[52] U.S. Cl. .................................. 277/229; 277/230; 277/DIG 6

[56] References Cited

U.S. PATENT DOCUMENTS

| | | | |
|---|---|---|---|
| 1,020,115 | 3/1912 | Price | 277/229 |
| 1,325,955 | 12/1919 | Payne | 277/229 |
| 1,715,072 | 5/1929 | Medernach | 277/230 X |
| 2,072,543 | 3/1937 | Crane | 277/229 X |
| 2,562,262 | 7/1951 | Witt, Sr. | 277/235 R X |
| 2,666,005 | 1/1954 | Norehad | 277/229 |
| 3,033,722 | 5/1962 | Goodloe | 277/229 |
| 3,894,742 | 7/1975 | Trelease | 277/229 |
| 4,116,451 | 9/1978 | Nixon et al. | 277/DIG. 6 X |
| 4,350,346 | 9/1982 | Fowler | 277/188 A X |
| 4,455,334 | 6/1984 | Ogino et al. | 277/235 B |
| 4,559,248 | 12/1985 | Sumiyoshi et al. | 277/DIG. 6 X |
| 4,559,249 | 12/1985 | Arigaya et al. | 277/230 X |
| 4,607,851 | 8/1986 | Usher | 277/230 X |
| 4,667,969 | 5/1987 | Suggs, III | 277/230 |
| 4,705,722 | 11/1987 | Ueda et al. | 277/230 X |
| 4,709,758 | 12/1987 | Preston, Jr. | 277/235 R X |
| 4,802,698 | 2/1989 | Fujisawa et al. | 277/228 X |

FOREIGN PATENT DOCUMENTS

| | | | |
|---|---|---|---|
| 50-39217 | 12/1975 | Japan | 277/230 |
| 53-14993 | 8/1979 | Japan | 277/229 |
| 454649 | 1/1935 | United Kingdom | 277/230 |

OTHER PUBLICATIONS

Machine Design, "Seals" (3rd ed.); edited by Benjamin L. Hummel, pp. 39-44, publ. Mar. 9, 1967.
"U.S. Packings" catalog; p. 51, date=Nov. 15, 1938.
Electric Power Research Institute, "Assessment of Industry Valve Problems", EPRI NP-241, Nov. 1976.
Electric Power Research Institute, "Valve Stem Packing Improvements", EPRI NP-4255, Feb. 1986.
Rockwell International, "Tests of Asbestos-Free Stem Packings for Valves for Valves for Elevated Temperature Service", V-Rep 86-2, by E. A. Bake and R. J. Gradle, Aug. 1986.
Power, "Upgrade Performance and Maintainability of Valves", May 1987, p. 67.
Electric Power Research Institute, "Valve Stem Packing Improvements", EPRI NP-5697, May 1988.
GRAFOIL ® Technical Bulletin No. G-203, Union Carbide Corporation, 1987.

*Primary Examiner*—William A. Cuchlinski, Jr.
*Assistant Examiner*—Scott W. Cummings
*Attorney, Agent, or Firm*—Kennedy & Kennedy

[57] ABSTRACT

A packing material for formation of a seal for a rotary or reciprocating shaft is disclosed wherein a core element is enveloped by a sheet of expanded graphite material. The core element is preferably formed of a wire mesh and solid graphite. The enveloping process is accomplished in such a manner as to wrap the core element with a self-lubricating surface material. The packing material of the present invention provides the advantages of graphite packings and metallic core packings.

5 Claims, 3 Drawing Sheets

IMPROVED SPIRALLY-FORMED SEAL FOR SHAFTS AND VALVE STEMS

This is a continuation of application Ser. No. 782,897 filed Oct. 20, 1991, now abandoned, which is Ser. No. 331,406 filed Mar. 31, 1989, now abandoned.

TECHNICAL FIELD

The present invention relates to seals for rotary or reciprocating shafts and valve stems. More particularly, the present invention relates to a seal for a stuffing box service wherein rotary or reciprocating shafts operate under conditions ranging from cryogenic to superheated temperatures, and from normal to extreme pressures and to vacuums.

BACKGROUND OF THE INVENTION

Pumps, compressors, agitators and valves are widely used in industries such as utilities, refineries, chemical and petrochemical facilities. While this equipment serves a variety of functions, each typically includes a rotary or reciprocating, motor-driven shaft. For example, the shaft of a rotary pump operatively connects a motor on the exterior of the pump casing to an impeller or blade on the interior of the casing. The motor rotates the shaft, which in turn, rotates the impeller. Fluid is pulled to the pump by the rotating impeller, passed across the impeller, and forced out of the pump under pressure. Thus, there are at least three openings in the pump (or valve) casing: (1) a first fluid opening for an inlet pipe; (2) a second fluid opening for an outlet pipe; and (3) an opening for the shaft.

The two fluid openings for the inlet and the outlet pipes are sealed conventionally. The shaft is sealed in a recessed area within the pump known as the "stuffing box". The stuffing box is located behind the impeller and in front of the opening in the pump casing through which the shaft projects. The term "stuffing box" is derived from the method employed to prevent fluid from leaking through the opening for the shaft; i.e. fluid is contained within the pump by stuffing or packing a material around the shaft to seal the opening. Thus, stuffing boxes in pumps, compressors, valves, etc. have the primary function of protecting the equipment against leakage at the point where the rotating or reciprocating shaft or the valve stem extends through the casing.

Rotary and reciprocating shaft equipped pumps, compressors, agitators and valves interact with a variety of fluids. Such fluids may be as harmless as cool water or as dangerous as a radioactive, superheated acid. Preventing leakage of any fluid from the opening for the shaft is, obviously, desirable. The cost of any such leakage can range from that associated with repairing the leak and replacing the fluid, to the unquantifiable cost of environmental damage or loss of life.

For example, consider a pump in a nuclear fueled steam generating plant. In nuclear reactors, pumps are used to circulate a coolant (oftentimes water) across nuclear fuel elements. The coolant and nuclear fuel are placed together in a pressure vessel. Piping from the pressure vessel delivers the coolant, heated by contact with the nuclear fuel, to a heat exchanger. The heat exchanger extracts the heat from the coolant. The coolant is then delivered once again to the pressure vessel to effect the cooling process. The piping thus forms a continuous loop between the pressure vessel and the heat exchanger so that the coolant is continuously recycled. As a result, radioactivity is safely contained within this closed system. Pumps are often provided between the pressure vessel and the heat exchanger to deliver the coolant. Any leakage from the pump destroys the closed system and permits radioactive coolant to escape. Failure of a seal in this example will not only result in the discharge of a toxic material into the environment, but could cause an explosion or fire.

Of course, the act of repairing such a leak carries many hidden costs. A nuclear reactor, like many other industrial processes requires significant time to regain normal operation. Any unnecessary shutdown of such a process greatly affects production capability. Thus, having to shut down a plant for any period of time in order to replace a failed packing reduces operating time and, correspondingly, profit.

Moreover, workers are often at risk in replacing failed packing. For example, a worker replacing failed (or worn) packing in a pump used to circulate coolant in a nuclear reactor incurs remarkable danger. The packing material in a pump and valve becomes saturated with the fluid with which it interacts. Thus, a worker replacing packing in a pump used to circulate coolant in a nuclear reactor will be exposed to radioactivity, since the coolant contains radioactive isotopes. A worker who removes failed packing from such a pump is, for a time, unavoidably exposed to radiation contained in the fluid. Accordingly, frequent replacement of the packing material in the stuffing box is not desirable. Moreover, it is preferred that all steps possible be taken to minimize the risk of such exposure and to minimize the length of time the worker is exposed.

Rotating and reciprocating shafts are difficult to seal because, in operation, the shaft is capable of both radial and axial displacement. Radial displacement typically results from manufacturing inaccuracies. Axial displacement results from different thermal expansions produced through normal operation of the shaft. The stuffing box environment is less than ideal. Conditions are constantly changing. Shaft speeds may vary. The packing may be required to withstand high temperatures and pressures one minute and low temperatures and pressures the next. The surfaces of the shaft in the stuffing box are often pitted and rough, causing excessive and uneven wear of the packing material. Those skilled in the art will appreciate that very slight defects in the arrangement or condition of a stuffing box can prevent proper pump operation.

In addition, those skilled in the art will appreciate that friction between the shaft and the packing produces heat. The more the shaft is pitted and roughed, the greater the coefficient of friction becomes between the shaft and the packing; accordingly, more heat is generated. Excessive heat can cause the packing to harden and lose resiliency, thereby creating spaces and gaps where leakage can occur between the packing and the shaft. Excessive friction can itself cause a valve to fail. In some instances, valve failure has resulted in a plant wide shut down. Consequently, the Nuclear Regulatory Commission ("NRC"), an administrative agency of the United States government, has recently undertaken an investigation of the effect of valve stem friction. Thus, the problem of stem friction is recognized as substantial. The packing must be made of a material that minimizes the inherent friction between the shaft and the packing.

To the greatest possible extent, the packing material must make accommodations for each of these factors.

The packing must be somewhat plastic so that it can be adjusted for proper operation. The packing must resist excessive extrusion, but expand enough to seal rough or uneven surfaces. The packing must be resilient in order to adapt to changing conditions without failing or damaging the shaft.

Various types of packing for a stuffing box are known in the prior art. Each of these packings attempt to be responsive to the foregoing considerations. However, in trying to provide flexibility, some packings sacrifice resiliency. Others, in trying to resist extrusion, sacrifice flexibility sufficient to conform to uneven and/or rough surfaces within the stuffing box. Still other packings are flexible, resilient and minimize friction, but do not provide a long-lasting seal so as to avoid frequent replacement.

Soft packing is a common shaft seal, and is generally made from asbestos, fabric, hemp or rubber fibers woven into strands and formed into a braided length. (It is to be understood that asbestos is being phased out as a packing material due to the well known health hazards posed by this material.) Soft packing is inexpensive and offers several desirable features. The softness of the packing allows it to absorb energy without damaging the rotating shaft. Soft packing is also very flexible and readily conforms to the area to be sealed.

Soft packing, however, has several disadvantages. One problem is short life. Soft packing is easily worn by friction and easily damaged, therefore requiring frequent replacement. Soft packing may be impregnated with graphite or lubricating oils to reduce friction between the shaft and the packing, but such lubricants quickly dissipate and are not very effective in overcoming the short life problem. Thus, soft packings are best suited for low shaft speed applications involving non-caustic and non-abrasive fluids. Further, soft packings are poorly suited for high temperatures and pressures. At high temperatures, fiber breakdown occurs. At high pressures, soft packings extrude excessively. Yet another problem with soft packing is a lack of resiliency. After being compressed and extruded, soft packings are unable to re-expand to effectuate a seal. Resiliency, conventionally defined as the ability of packing to re-expand, is important to enable the packing material to adjust to changing conditions. Lack of such resiliency, as in the case of a soft packing, results in frequent adjustment or replacement for the packing.

Another type of packing is metallic packing. Metallic packing is made similarly to soft packing, but incorporates flexible metallic strands or foils. In addition, metallic packing is often provided with an asbestos or plastic core. Metallic packings are not as flexible as soft packings, but are much more resilient. The resiliency of the metallic packing resists excessive extrusion and permits use in higher pressures. The metallic strands and foils are more resistant to breakdown due to high temperature than soft packings. Metallic packing suffers from the inability to minimize friction. While it is known to add lubricants, they eventually wear away. As with soft packings, metallic packings can be destroyed by friction, thereby resulting in leaks and damage to the shaft.

A known stuffing box packing is made from expanded graphite tape. More specifically, a known packing provides a length of flexible expanded graphite tape that is wound about a mandrel to form a solid annulus of appropriate size. Thus, the expanded graphite tape is itself formed as a seal and packed into the stuffing box. Packing made from expanded graphite is flexible and conforms to uneven surfaces. The graphite material makes the packing self-lubricating, thereby minimizing friction between the shaft and the packing. With such self-lubricating packings, the lubricant does not dissipate with time. Expanded graphite packing also absorbs energy without excessive damage to either the packing or the shaft.

The principal problems with expanded graphite packings are threefold. First, expanded graphite packings lack resiliency, resulting in an inability to adjust to changing conditions within the stuffing box. Second, expanded graphite packings extrude excessively under high temperatures, resulting in leaks and premature replacement. Thurd, expanded graphite packings are difficult to remove from a stuffing box because the packing is easily pulled apart by the hook or like tool that is inserted into the stuffing box to pull the packing material. Solid graphite packings are not able to withstand high pressures since they lack the internal strength to resist extrusion and are unable to re-expand after compression. In addition, expanded graphite packings require frequent adjustment under normal conditions due to the low resiliency of the graphite. The graphite packings are easily compressed, thereby contributing to the low resiliency problem. As a result, normal rotation or reciprocation of the shaft can compress the graphite and create leaks.

U.S. Pat. No. 4,667,969 teaches spirally winding expanded graphite foil tape in an overlapping manner about a resilient, flexible core of longitudinally braided yarns. Thus, this patent teaches a combination of soft packing together with an expanded graphite packing. The expanded graphite foil tape forms an energy absorbent, self-lubricating skin about the core. The core adds internal strength to resist extrusion and increases resilience to encourage re-expansion after compression.

Even so, combining a soft type of packing with an expanded graphite type of packing fails to provide any of the advantages presented by a metallic packing. As noted above, metallic packings are more resistant to high temperature breakdowns. Thus, the preferred packing would provide such high temperature stability.

Another principal advantage of metallic packing is the ease with which it can be removed from a stuffing box. Conventional removal of a packing material is accomplished with a hook or like device. Ideally, the hook is inserted into the stuffing box, secured within the packing to be removed, and pulled out of the stuffing box, pulling the packing material. therewith. Soft packing is difficult to remove because the material pulls apart. A soft packing material wrapped with an adhesive-backed flexible expanded graphite tape is also difficult to remove because the adhesive may catch the shaft or the valve stem. Because the adhesive is also bonded to the soft core, the entire packing may become lodged within the stuffing box. Metallic packing is easier to remove because the hook can latch onto one of the metallic strands (which is in turn interwoven with other metallic strands) such that the entire packing can be readily pulled from the stuffing box. This feature of metallic packings is particularly important in terms of reducing the amount of time required to replace worn or failed packing. Taking the nuclear power plant example given hereinabove, it will be appreciated that every second a worker is needlessly exposed to radiation is to be eliminated. When a soft packing disintegrates within a stuffing box, the worker spends an inordinate amount of time removing the packing section-by-section—resulting in an inordinate amount of exposure to radiation. Because metallic packing is far less likely to disintegrate and much easier to remove, the worker is subjected to much less radiation.

A great deal of attention in stuffing box seals has focused on the core element. For example, it is known to provide a soft flexible core made of a yarn or like fiber. Such a core is beneficial in that, like soft packings, a soft core is inexpensive, readily conforms to the stuffing box, and absorbs energy without damaging the shaft. It is further known to provide a core of metal mesh core. Metallic cores, like metal packings, are very effective under high pressure and high temperature conditions. Metallic cores are also easy to remove from a stuffing box. However, metallic cores are unable to minimize friction. This problem is compounded by the fact that lubricants cannot be added under conventional technology to a metallic core. Thus, no lubricant could be used to reduce the coefficient of friction introduced by a metallic core element. U.S. Pat. No. 4,219,204 further shows that it is known to provide a combination of discrete sections made of different materials. More specifically, U.S. Pat. No. 4,219,204 shows a sealing device that incorporates anti-extrusion sections formed of knitted materials which, in turn, incorporate some metallic wires or filaments.

Those skilled in the art will appreciate that a stuffing box seal defines an inside and an outside diameter. The inside diameter is defined according to the shaft or valve stem. The outside diameter is defined according to the wall of the stuffing box. Conventional seals come in long lengths of varied cross-sections; i.e. $\frac{3}{8}$", $\frac{1}{2}$", $\frac{5}{8}$", etc. It is industry practice to buy a length of a packing material and cut the material to a predetermined, shorter length, from which to form a single, ring-like seal. Formation of the seal is conventionally accomplished by die-molding. The cut length of packing material is placed in a die, where it is compressed to a desired density and to the appropriate inside and outside diameter specifications. The molded ring is then provided to the end-user where it is installed into the stuffing box. The alternative to this die-molding operation is to order a length of packing material and utilize the stuffing box itself to achieve the appropriate density. According to this alternative, the length of packing material is cut and a ring formed. The ring is inserted into the stuffing box and the gland follower secured to compress the sealing ring to an appropriate density. The gland follower is then removed to permit introduction of the next sealing ring and the process repeated for that seal ring; and each of the additional sealing rings to be installed. Packing material of varying cross sections and diameters are stocked to provide replacement seals when needed. The method carries the obvious disadvantages of being inaccurate in terms of compression and slow to number of repetitions that must be undertaken with the gland follower.

The prior art therefore lacks a core element that combines the benefits of graphite with the benefits of a metallic core. There is a need for a packing material that combines the benefits of a metallic packing material with those of soft and expanded graphite types of packing materials. Stated otherwise, there exists a need for a packing material formed with a core that is sufficiently resilient and self-lubricating but resists extrusion; that provides a core element that performs well under both high temperatures and high pressures; but returns the benefits of soft cores and metallic cores. Further, there is a need for a seal that provides the benefits of a previously formed seal but avoids the need to stockpile a variety of seals having different inside and outside diameters. Yet further, there is a need for a seal that omits the die-molding step of conventional installation so as to reduce the time required to replace an old or worn out seal. Finally, there exists a need in the art for an economical, simple method of manufacturing such a packing.

SUMMARY OF THE INVENTION

The present invention solves the above-described problems in the prior art by providing a sealing device that incorporates a flexible, resilient, self-lubricating and long-lasting core element that enjoys the benefits of expanded graphite and a metallic core. The present invention further provides a spiral seal that may be cut to the desired length for installation, but is readily conformed to a broad range of stuffing box inside and outside diameters to thereby eliminate the need for stocking multiple seals of varying diameters. In addition, the present invention provides an economical, simple and cost-effective method of manufacturing such an element.

Briefly described, a seal in accordance with the present invention comprises a flexible graphite skin element that encases a metal mesh core impregnated with graphite, a binder and a solvent. The core is wrapped with a graphite tape or sheet to provide a uniform and consistent packing material. The preferred form of the present invention is spiral; but the packing material may comprise a die-molded ring.

The present invention further provides a method of manufacturing the above-described packing. Briefly described, the method of the present invention comprises dipping a length of wire mesh into a mixture of graphite powder, binder and solvent. Once the mixture dries, a flexible core is produced possessing the beneficial aspects of both a wire mesh core and graphite lubrication for high temperature, high pressure sealing. The core is then wrapped with a skin element made of expanded graphite. Once so wrapped, the resulting sealing material is resilient yet conformable, and maintains its structural integrity through the installation and removal processes. That material may then be passed through a coiling device that also densifies the material to the desired degree so that the product is ready for installation into the stuffing box.

Those skilled in the art will appreciate that a packing manufactured in accordance with the present invention is easier to remove from a stuffing box by virtue of the improved core. Often, a hook or like element is inserted into the stuffing box to catch and pull the seal from the stuffing box. However, because the seals to be removed are often worn or otherwise deteriorated to such a significant extent, the seal must be removed in pieces. The present invention addresses this problem by means of the improved core, which will retain its structural integrity while the seal is removed from the stuffing box.

The seal of the present invention may be preformed into a densified spiral. The cross-section is square. Thus, the seal may be preformed into a desired form for a desired application, as opposed to necessarily being die-molded. As indicated hereinabove, a conventional process for forming a seal is die-molding. In this process, a length of packing material is cut and set into a ring-like form. That form is then introduced to a die wherein it is compressed to a desired density and shape.

The desired shape will take into account the given inside and outside diameters as set by the stuffing box to be filled. The packing material of the present invention may be die molded to provide a sealing member. Furthermore, the present invention may also provide a spiral that can be cut to an appropriate length to form the ring, and then inserted directly into the stuffing box. Densification and sizing can be accomplished by the compression force exerted by the gland follower as the stuffing box is closed. By virtue of the metallic fabric of the present core, the seal will retain its shape for quick insertion into a stuffing box. As a result, insertion of the preformed or prefabricated seal into the stuffing box requires less time, thereby minimizing the time a worker is exposed to fluid within the equipment and decreasing the time over which the equipment (or the system) must be shut down for repair.

Accordingly, it is an object of the present invention to provide an improved packing material in a spiral form for a rotary and/or reciprocating shaft or valve stem.

It is another object of the present invention to provide an improved method of manufacturing a seal for a stuffing box.

It is another object of the present invention to provide a packing material of uniform density throughout its length, thereby creating a uniformly dense seal.

It is another object of the present invention to provide a packing material that can be densified by die molding or by use of a stuffing box gland follower.

It is another object of the present invention to provide a packing material that can be provided in a predensified spiral.

It is another object of the present invention to provide a method and apparatus for making a predensified spiral of a packing material.

It is a further object of the present invention to provide a packing material that retains the desirable characteristics of both die formed expanded graphite seals, soft packings and metallic packings, while minimizing the disadvantages of prior art constructions and providing long lengths for convenient cuttings.

It is a further object of the present invention to reduce downtime of systems employing rotary and reciprocating shafts.

It is a further object of the present invention to reduce the time for which a worker is exposed to fluids being pumped, compressed or agitated by rotary and/or reciprocating shafts.

It is a further object of the present invention to produce a long-lasting seal and reduce the number of times per unit time that a seal must be replaced.

It is a further object of the present invention to provide an improved method for manufacturing a self-lubricating seal for a rotary and/or reciprocating shaft.

It is a further object of the present invention to provide a less expensive, less labor intensive and simpler method for producing a seal for a rotary and/or reciprocating shaft or valve stem.

It is a further object of the present invention to provide a special length of packing material that can be cut on site by a user to obtain an appropriately-sized sealing member.

It is a further object of the present invention to provide a packing material that reduces valve stem friction.

It is a further object of the present invention to provide a packing material that is easier to remove from a stuffing box, thereby reducing the time a particular pump, valve or like mechanical system is shut down for maintenance.

It is a further object of the present invention to provide a sealing member that avoids sepage through the intercese of the packing material and avoids weeping of fluids into the stuffing box.

It is a further object of the present invention to provide an improved core for a shaft and valve stem seal.

It is a further object of the present invention to provide a core for a shaft and valve stem seal that provides the benefits of a metal core and graphite lubrication.

It is a further object of the present invention to provide a method for manufacturing an improved core element that provides the benefits of a metal core and graphite lubrication.

It is a further object of the present invention to provide a method for forming a length of sealing material that can be wound into a preformed state for insertion into a stuffing box.

These and other objects, features and advantages of the present invention will become apparent from a reading of the following specification, when taken in conjunction with the drawings and appended claims.

DETAILED DESCRIPTION

Figure 1:
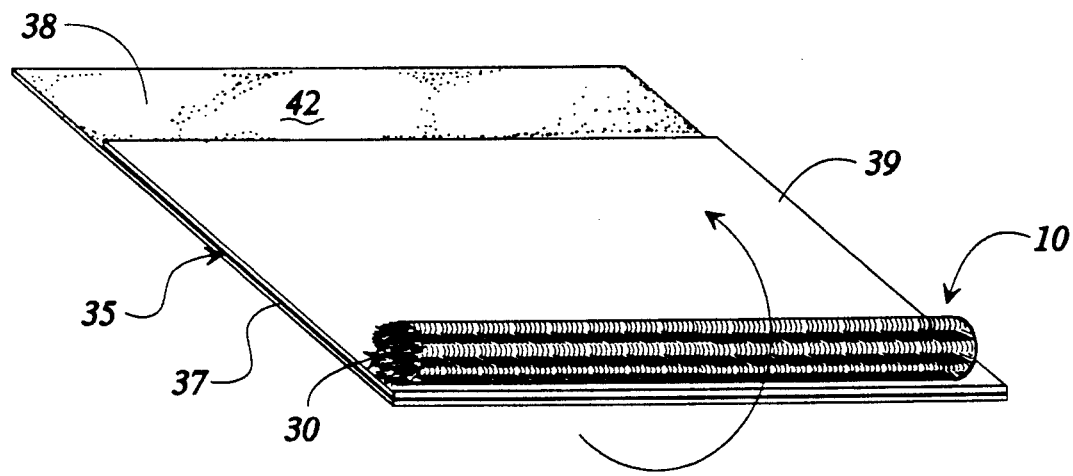
FIG. 1 is a perspective view of a preferred embodiment of a seal of the present invention.
Figure 1A:
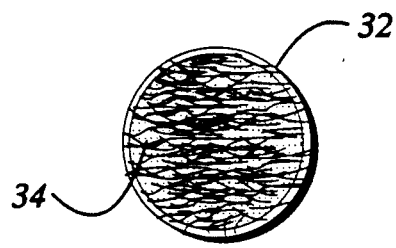
FIG. 1A is an end view of a core element of the preferred embodiment shown in FIG. 1.
Figure 2:
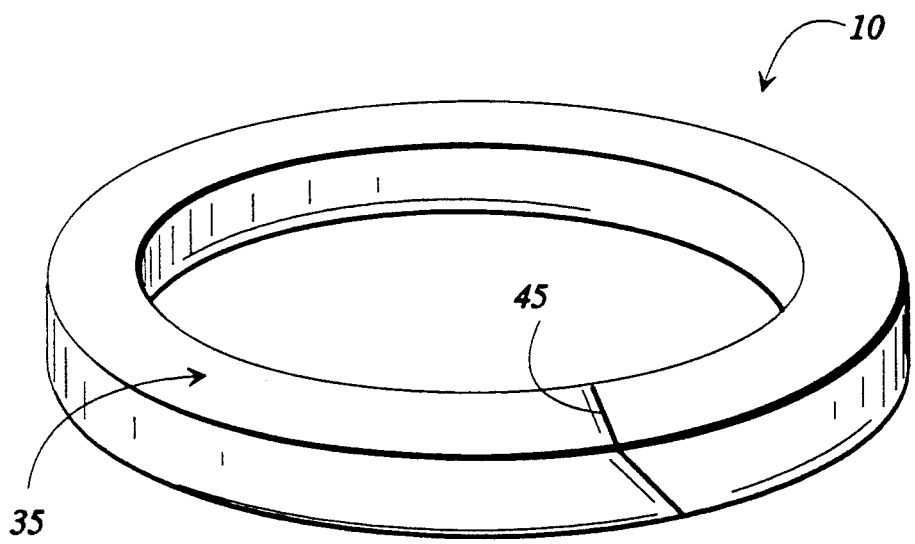
FIG. 2 is a perspective view of the embodiment of FIG. 1, showing manufacture of said embodiment.

Referring now in more detail to the drawings, in which like numerals indicate like parts throughout the several views, FIG. 1 shows a preferred embodiment of the present invention generally at 10. It is to be understood that the present invention comprises a seal and is referred to herein as either a seal or a packing material.

Figure 4:
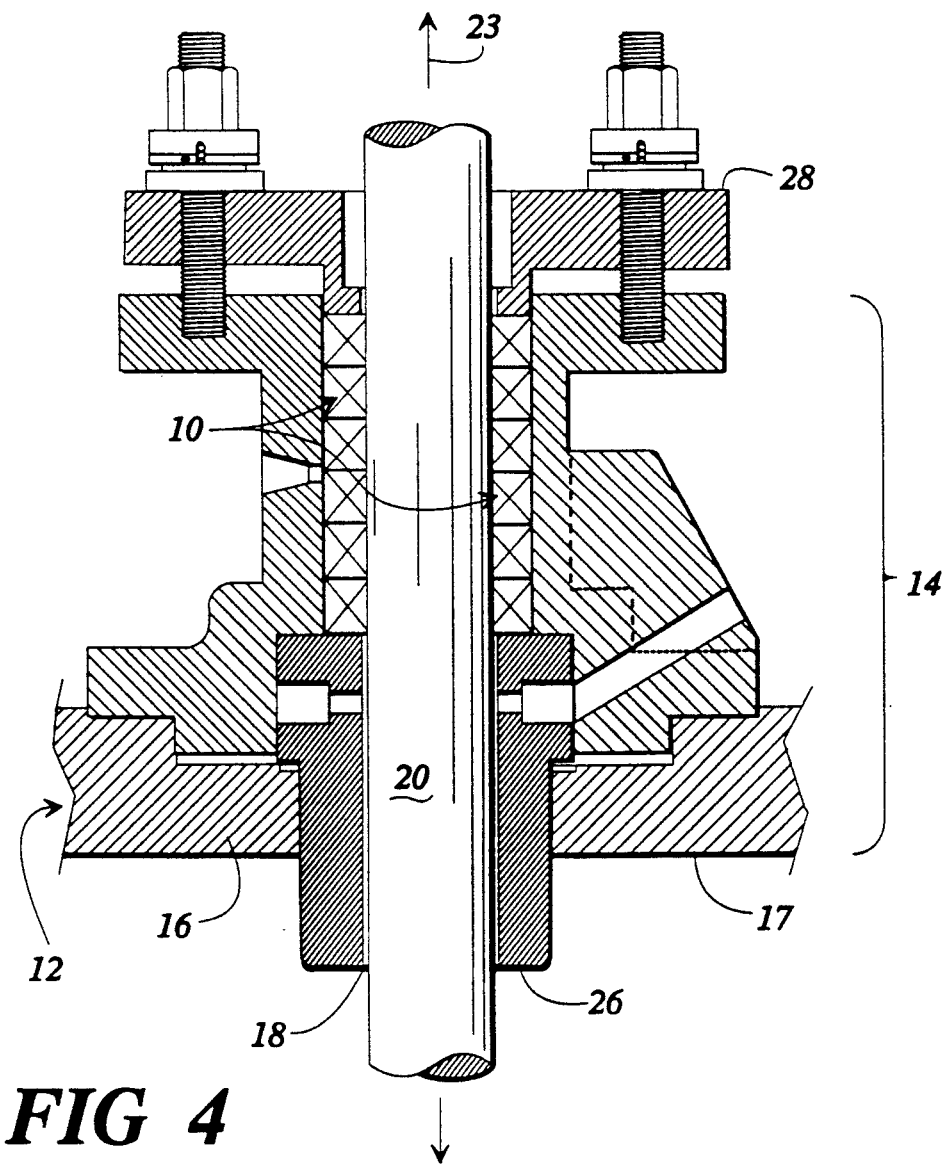
FIG. 4 is a cross-section view of a pump, including a stuffing box, showing use of a preferred embodiment of the present invention.
Figure 6:
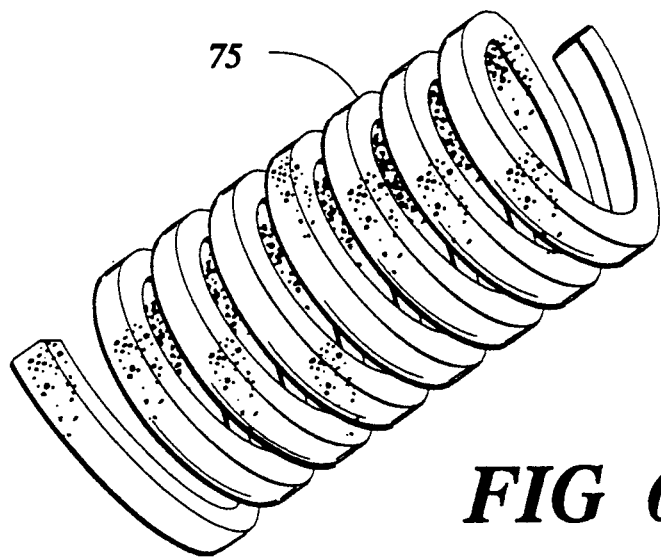
FIG. 6 is a perspective view of a spinal seal embodying the present invention.

FIG. 4 in cross-section shows a plurality of seals 10 constructed in accordance with the present invention installed in a pump 12. FIG. 6 shows in perspective a spiral length 75 of packing material made in accordance with the present invention. It is to be appreciated that the seals 10 were formed from the spiral length 75 as taught by the present invention. It is to be further appreciated that the pump 12 is described for explanation and that the present invention has equal, if not superior, application to valves and like fluid flow equipment. The pump 12 provides a stuffing box 14 and defines three openings 16, 17 and 18. Openings 16 and 17 are fluid flow ports provided for the intake and expulsion of fluid, respectively. Opening 16 identifies the location at which fluid enters the pump 12 and opening 17 identifies the location at which fluid is expelled from the pump. Opening 18 is provided for a shaft 20. The shaft 20 connects to a motor (not shown) at one end and to an impeller (not shown) at the other end. The motor end of the shaft 20 is indicated by the arrow identified at 23. The impeller end of the shaft 20 is indicated by the arrow identified at 24.

Toward the impeller end 24, the shaft 20 is encompassed by a bushing 26. Toward the motor end 23, the shaft 20 is encompassed by a gland follower 28. Those skilled in the art will appreciate that the gland follower 28 is conventionally torqued down to exert a pressure in the direction of the impeller end 24 of the shaft 20. Those skilled in the art will appreciate that the gland follower 28 does not exert any radial pressure against the shaft 20.

It is to be further noted that when equipment such as a pump operates with a negative pressure head, the stuffing box 14 is under a vacuum. Under such conditions, air can leak into the pump 12. To keep air out, a lantern ring or seal cage may be used. The lantern ring separates the sealing device into two sections. A sealing fluid, such as water, is injected under pressure into the space created by the lantern ring. The sealing fluid is forced in both actual directions, thereby preventing air from entering the pump. It is to be appreciated that although not shown, the present invention is suited for use with a lantern ring.

Juxtaposed between the bushing 26 and the gland follower 28 are a plurality of seals 10 constructed in accordance with the present invention. The seals 10 are shown in cross-section. The seals 10 are identical in construction and, therefore, only one will be described in detail herein.

Referring to FIGS. 1, 1A, 2 and 3, the packing material of the present invention provides a core 30. The core comprises a skeletal element 32, preferably made of wire mesh. A particularly well suited skeletal element 32 is made of inconnel mesh. The skeletal element 32 is filled with solid graphite 32. The method of filling the skeletal element 32 with the graphite 34 is described in detail hereinbelow.

The preferred seal 10 of the present invention further includes an expanded graphite foil sheet 35. The sheet 35, as shown in FIG. 1, is of such dimension as to be fully enveloped about the length of the core 30. The sheet of graphite foil sheet 38 is, like graphite foil tape, self-lubricating. Thus, use of such a material provides the advantages of graphite seals discussed hereinabove.

The preferred graphite foil sheet 35 may be formed in the following manner. A first expanded graphite foil layer 37 is coated with an adhesive layer on one side 38. A second expanded graphite foil layer 39 is likewise coated with an adhesive layer on one side 40. It is to be understood that the second expanded graphite foil layer 39 is of reduced size relative to the first expanded graphite foil layer 37. Specifically, the width of the sheets 37 and 39 are substantially equal. However, the second sheet 39 is of a lesser length than the first sheet 45. The two sheets 37 and 39 are then secured in a face-to-face manner; adhesive side 38 to adhesive side 40, to form the graphite sheet 35. This securing is done in such a way as to leave an area of exposed adhesive 42 of the first graphite foil sheet 37. Preferably, no other adhesive portion is exposed.

To form the seal 10, the core element 30 is placed at the end of the graphite sheet 35 opposite the exposed adhesive area 42. The graphite sheet 35 is then wrapped about the core 30, so that the core 30 travels in the direction of the exposed adhesive area 42. The exposed adhesive area 42, upon conclusion of the wrapping motion, is secured to the graphite sheet 35 and not the core 30. Thus, it is a principal advantage of the present invention that no adhesive is placed against the core 30.

Turning again to FIG. 3, it will be seen that the excess foil sheet may be twisted and eventually cut off of the seal 10 to provide the finished product in bulk form. The assembled packing material is then formed into a circular or ring-like shape as shown in FIG. 1. This can be conventionally done either manually or by machine. As further shown in FIG. 1, it will be appreciated that the ends of the packing material may be matingly cut as shown at 45 to insure that the ends remain in the circular formation. Once the circular formation is obtained, the packing material can be sized or otherwise conformed by compression of the material to obtain the desired shape and configuration.

Figure 3:
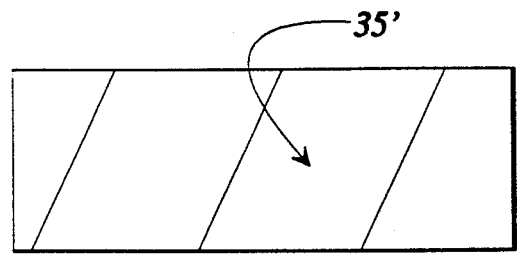
FIG. 3 is a front plan view of a length of packing material constructed in accordance with the present invention.

The core element 30 is made of the skeletal element 32 and solid graphite 34. The core 30 is preferably made as follows. An ambient solution of graphite powder, binder and solvent is prepared. The preferred solution consists approximately of two parts graphite powder to comparable units of binder and solvent. The solution is stirred to provide a consistent mixture. The skeletal element 32 is then dipped into the solution and maintained therein until the skeletal element is filled with the solution. The filled skeletal element 32 is removed from the solution and the liquid graphite solution is permitted to dry. Once dry, the hardened solution is fixed within the skeletal element 32 to form the unitary core 30. It is to be understood that the core 30 is flexible in that it can be conformed to any stuffing box, and will retain such shape. It is to be further understood that the graphite skin 35 may be wound about the core 30. This arrangement is shown in FIG. 3, the skin element being indicated at 35'.

A bulk length of the above-described packing material 10 may be prepared by the described method, but by repeating several steps such that an extended core 30 and extended length of graphite foil sheet 38 are employed with adhesive strips at desired positions. In such a case, the assembled packing material 10 may then be cut into appropriate lengths for forming into a plurality of seal. As shown in FIG. 1, the cutting lines may extend diagonally across one pair of opposed faces of the assembled packing material to obtain the mating engagement of the ends of the seal.

Figure 5:
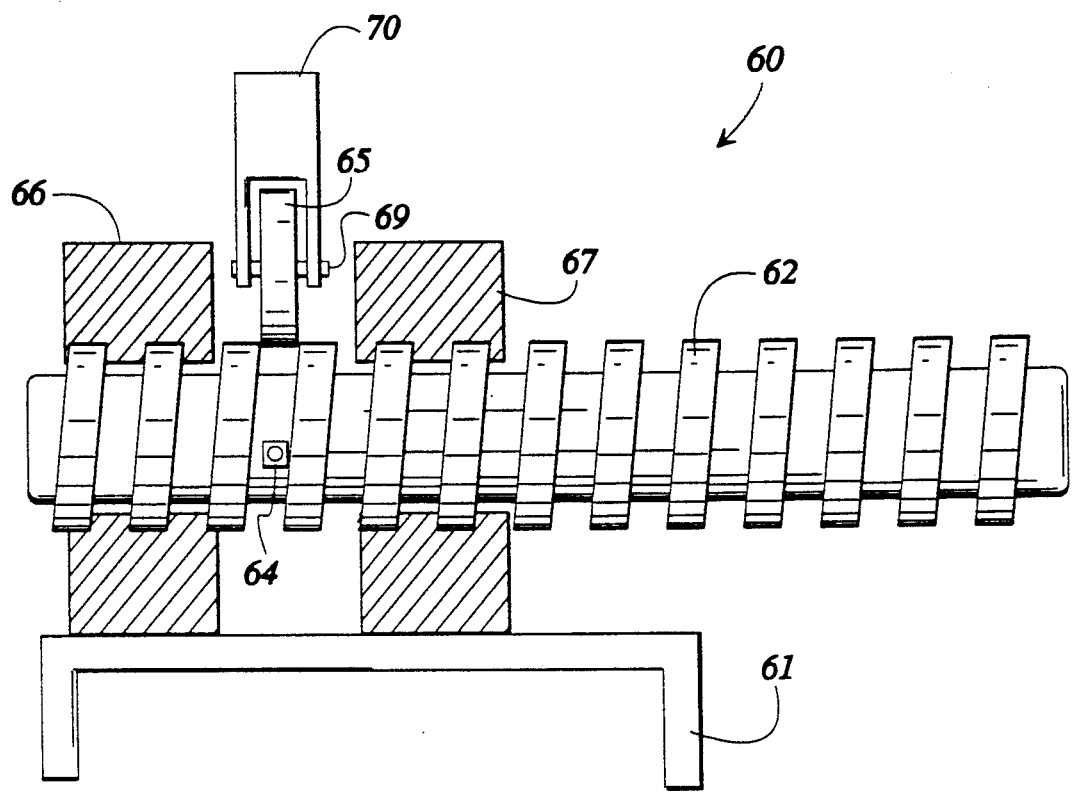
FIG. 5 is a schematic view showing a device for forming a packing material made in accordance with the present invention into a coil.

The core 30 and skin element 35 of the present invention can be manipulated to provide a preformed seal in an appropriately shaped spiral. Turning to FIG. 5, a coiling device 60 is shown whereby the packing material 10 may be preformed. The device 60, which is shown as sitting on a table 61, includes a powered auger screw 62, a set screw 64, a roller 65 and a set of bearings 66 and 67. The roller 65 consists of a freely rotating wheel that turns about a pin 69 depending from a mounting plate 70. In use, a length of packing material 10 is manufactured according to the foregoing described method and introduced to the coiling device 60. More particularly, one end of the length of packing material 10 is attached to the coiling device 60 by means of the set screw 64. The auger screw 62 is turned by a remote power source (not shown). The auger screw 62 rotates within the bearings 66 and 67, which hold the screw 62 steady and assist in the forming process. As the packing material 10 works its way into the coiling device 60, it is compressed by the roller 65, which causes the material 10 to assume the width between the screw threads of the auger screw 64. As a result of the turning of the auger screw 64, the packing 10 is delivered past the bearing 67. The packing 10 is then unwrapped from the auger screw 64. The packing 10 retains the spiral shape imparted by the operator of the auger screw 64 and the compression roller 65.

Those skilled in the art will appreciate that the seal 10 of the present invention may be manufactured at less cost than prior art seals. Several steps, if not all, of the manufacturing process are easily automated. Moreover, the present invention provides a seal having a unitary, uniformly dense layer of expanded graphite about the outer surface of the core. The present invention eliminates the need for excessive use of adhesives, and retains the benefits of both soft packings and metallic or graphite packings. Moreover, various alternative embodiments may be readily provided. For example, the core 30 may be formed with trapezoidal cross-section, or, the core may be formed with faces presented concavely or convexly curved. Such considerations are dictated by the ultimate use of the seal. In the present invention it is not limited to the disclosed preferred embodiment.

Those skilled in the art will further appreciate that the ability of the present invention to provide a preformed seal greatly eases the installation and removal processes.

In terms of installation, a preformed seal eliminates the need for on-site die-molding of a sealing ring. The spiral length 75 is cut to form a plurality of seal rings 10. The seal rings 10 are placed in the stuffing box 14. When the stuffing box 12 is full, the gland follower 28 is secured, thereby compressing the seal rings 10 to the appropriate inside and outside diameters of the stuffing box 14. The metallic core 30 acts like a spring in opening and closing to provide the proper ring size. The graphite and binder allows for such opening and closing, but insures a seal of uniform density and consistent cross-section. As a result, one length of packing material 75 can be used to seal stuffing boxes of various dimensions.

Yet further, the ability of the spiral 75 to provide a sealing member for various stuffing boxes eliminates the need for stocking multiple die-molded seals for different stuffing boxes.

In terms of removal, the metallic core 30 provides a catch for the hook element whereby the sealing ring 10 is easily and securely seized. The metallic core 30 further provides for simple removal of the sealing ring 10 because it will not pull apart or split when the hook pulls the sealing ring from the stuffing box.

While this invention has been described in detail with particular reference to the preferred embodiment, method of manufacture and use thereof, it should be understood that variations and modifications may be made without departing from the spirit and scope of the invention as hereinbefore described and as defined in the following claims.

What is claimed is:

1. A packing material for use in the formation of a seal, comprising:
   a flexible core made of mesh wire and expanded solidified graphite, said core being of a substantially rectangular cross-section; and
   a skin element of expanded graphite material longitudinally enveloped about said core,
   said packing material being formed into a coil having a first diameter, whereby a ring of said packing material is formed by cutting a length of said packing material for insertion into a cavity to be sealed, said cavity having a second different diameter.

2. The packing material of claim 1 wherein said skin element of expanded graphite material comprises a sheet of expanded graphite.

3. The packing material of claim 1 wherein said skin element comprises a winding of graphite foil tape.

4. A preformed seal for a reciprocating or rotary shaft that passes through an opening in a stuffing box, comprising:
   a core element, said core element comprising a length of a skeletal element made of wire mesh and solid graphite captured by said wire mesh so as to provide a unitary structure;
   a skin of graphite foil longitudinal wrapped about said core element;
   means for securing said skin of graphite foil to said core element to provide a seal; and
   means for forming said seal into a coil whereby a performed seal is produced for ready insertion into a stuffing box.

5. A packing material for use in forming a seal, comprising
   a core of flexible material and expanded solidified graphite, said core being of a substantially rectangular cross-section;
   a skin element of expanded graphite longitudinally wrapped about said core to form a linear strand,
   said linear strand turned on a screw against a wheel to compress said packing material to a predetermined cross-section and to convert said linear strand into a coil having a first diameter, whereby a length of said packing material may be cut from said coil to fit a second diameter of an article to be sealed, said length of coiled packing material adaptable to being opened and closed to said second diameter different from said first diameter.

* * * * *